United States Patent [19]

Ashmore

[11] Patent Number: 4,528,948
[45] Date of Patent: Jul. 16, 1985

[54] OCTANE BOOSTER FOR ENGINES

[75] Inventor: Mike J. Ashmore, Broken Arrow, Okla.

[73] Assignee: Atlas Investment Co., Oklahoma City, Okla.

[21] Appl. No.: 111,318

[22] Filed: Jan. 11, 1980

[51] Int. Cl.³ ............................................. F02M 25/02
[52] U.S. Cl. ................................. 123/25 L; 123/25 A
[58] Field of Search ................. 123/25 R, 25 A, 25 C

[56] References Cited

U.S. PATENT DOCUMENTS 3,716,040 2/1973 Herpin ............................... 123/25 R Primary Examiner—Ira S. Lazarus
Attorney, Agent, or Firm—Head, Johnson & Stevenson

[57] ABSTRACT

A performance improving means for an internal combustion engine having an intake manifold, a carburetor and a vacuum intake between the manifold and carburetor, including an upright vessel having an air inlet and an outlet opening in the upper portion, a tube connecting the vessel outlet to the engine vacuum intake, a vertical tube within the vessel communicating at the upper end with the vessel inlet opening and the lower end terminating adjacent the vessel bottom, a valve connected to the vessel inlet so that the rate of flow of air into the tube in the vessel may be adjusted, and a water emissible liquid within the vessel, air being drawn into the vessel through the valve and tube and out through the bottom of the tube bubbling upward within the liquid forming a vapor which is drawn into the engine intake manifold.

2 Claims, 3 Drawing Figures

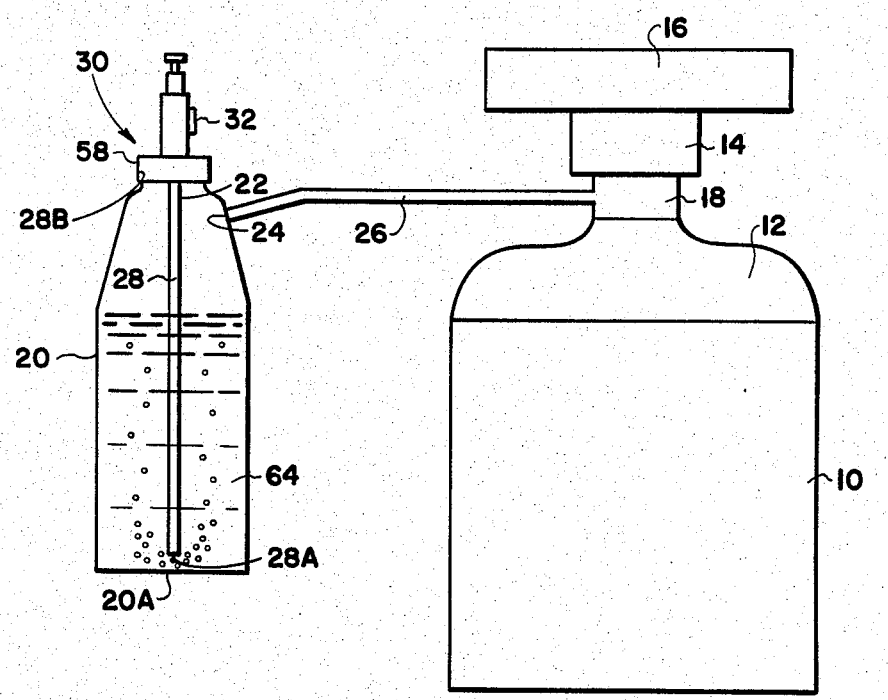
Fig. 1
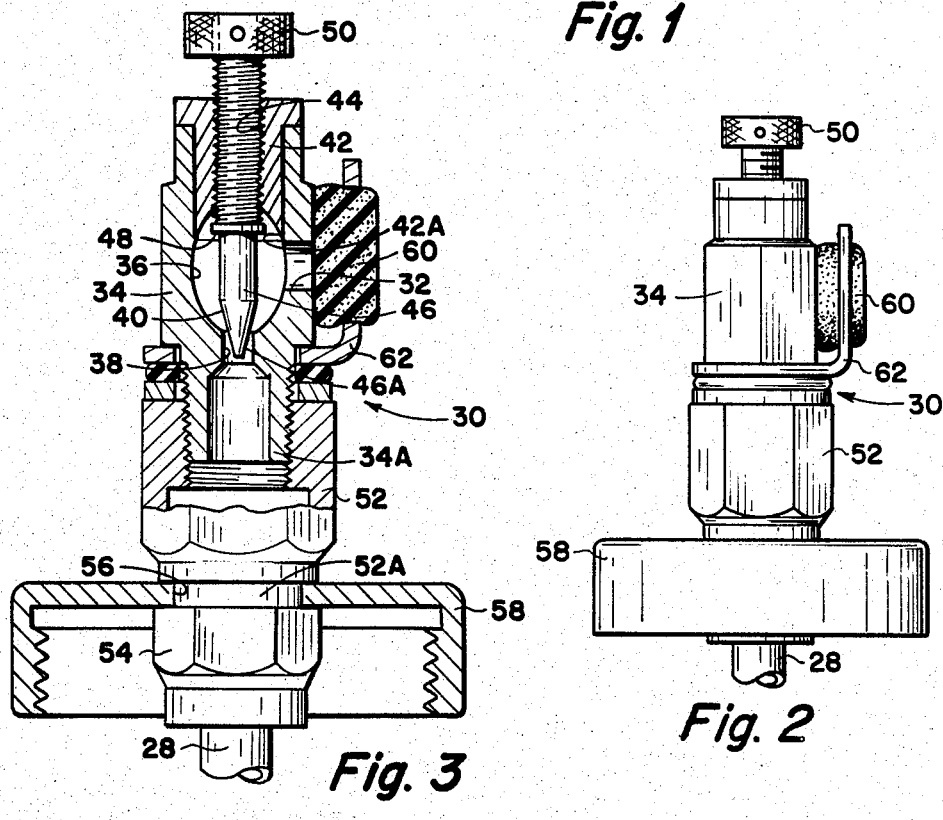
Fig. 2
Fig. 3

OCTANE BOOSTER FOR ENGINES

BACKGROUND OF THE INVENTION

1. Field of the Invention

This invention relates to apparatus for improving the performance and efficiency of an internal combustion engine, particularly of the type utilizing gasoline as a fuel, and more particularly, to the type of apparatus wherein a supplementary vapor is introduced into the engine intake manifold to improve combustion of gasoline within the engine.

2. Description of the Prior Art

Others have provided devices generally known as water injectors for engines. These usually include some means of bubbling air through a water reservoir which is drawn into the engine. While such devices have, in the past, worked successfully to a limited extent, they have not proven sufficiently valuable as to be universally employed.

The present invention is directed towards an improved concept for introducing vapor into an engine intake manifold for co-mingling with the air and fuel vapor passing out of the engine carburetor to enhance the combustion characteristics of the fuel and to thereby improve the performance and efficiency of the engine.

It is therefore an object of the present invention to provide an improved means for improving the performance of an internal combustion engine.

SUMMARY OF THE INVENTION

The invention provides a performance improving means for an internal combustion engine of the type employed commonly in automobiles. Typical automobile engines include an intake manifold with a carburetor on the manifold. The carburetor functions to vaporize gasoline in air drawn through the carburetor. The output of the carburetor passes through a vacuum intake and into the engine intake manifold where the vaporized gasoline and air is distributed to each of the engine cylinders. The present invention includes an upright vessel having an inlet and an outlet opening. These openings are in the upper portion of the vessel, and in the preferred embodiment the inlet opening is in the top of the vessel. A tube connects the vessel outlet opening with the engine vacuum intake between the carburetor and intake manifold. A vertical tube within the vessel is connected at the upper end with the vessel inlet. The lower end of the tube is unobstructed and terminates adjacent the interior bottom of the vessel. A valve, preferably in the form of a needle valve, is affixed to the vessel at the upper end and is connected to the vessel air inlet. The valve has an air inlet and a means externally of the valve for adjusting the opening to thereby adjust the amount of air passing through the valve. Positioned in the vessel is a water emissible liquid. Air drawn by the vacuum effect of the engine into the interior of the vessel passes through the valve and downwardly through the tube and bubbles upwardly through the liquid in the vessel. This forms a vapor which is drawn from the vessel outlet into the engine manifold. The vapor serves to enhance the performance of the engine by providing a higher octane effect by reducing the flash point of the vaporized gasoline.

DESCRIPTION OF THE VIEWS

FIG. 1 is a diagrammatic view showing a typical internal combustion engine having an intake manifold, a carburetor, and a vacuum intake between the carburetor and manifold and showing the vessel of the present device connected to the engine vacuum intake.

FIG. 2 is an enlarged external view of a valve utilized in practicing the invention.

FIG. 3 is an elevational view as shown in FIG. 1 and showing the valve partially in cross-section to reveal the interior construction thereof.

DETAILED DESCRIPTION

Referring to FIG. 1, an internal combustion engine is indicated by the numeral 10. As typical of engines, an intake manifold 12 is employed to distribute air and fuel mixture to the cylinders of the engine. Supported on top of the intake manifold 12 is a carburetor 14 which is connected to a fuel source (not shown) and functions to atomize a liquid fuel, usually gasoline, to provide a vaporous fuel as it is mixed with air drawn through the carburetor to provide the combustible fuel-air mixture which is consumed in the engine 10. An air filter 16 is used to filter air passing into the carburetor 14.

Between the carburetor 14 and intake manifold 14 is a vacuum intake 18. In some engine designs vacuum intake 18 is a shallow plate providing ports to afford a supply of vacuum for various functions of the vehicle in which the engine 10 is employed. In other designs the vacuum intake 18 may merely be a threaded port in the intake manifold 12 or in the lower portion of carburetor 14. In any event, the vacuum intake 18 represents communication with the area between the carburetor 14 and intake manifold 12 wherein the air and fuel mixture from the carburetor passes into the intake manifold for distribution to the cylinders.

The engine described to this point is typical of internal combustion engines utilized in cars and trucks throughout the world at the present time using gasoline as a fuel. The present invention is a means to improve the performance of engine 10. An upright vessel 20 is mounted adjacent the engine. The vessel 20 has an upper inlet 22 and an air outlet 24 in the upper end. A conduit 26 connects the air outlet 24 to the engine intake 18. Thus, vacuum from the engine is supplied to the interior of the vessel 20 permitting air to be drawn into the vessel through air inlet 22.

Within vessel 20 is an upright tube 28, the upper end of which connects to the vessel air inlet 22. The lower end 28A is open and terminates above the interior bottom 20B of the vessel 20A.

A means is provided for regulating the flow of air into vessel 10 in the form of a valve generally indicated by the numeral 30. The valve has an air inlet 32 and the valve air outlet connects with the upper end of tube 28.

Referring to FIGS. 2 and 3, the details of a preferred embodiment of valve 30 are shown. The valve body 34 has a cavity 36 therein which is preferably as illustrated, in the form of an elliptical shape and more precisely, the cavity is generally configured as generated by an ellipse rotated about the longitudinal axis of body 34. The valve air inlet 32 intersects cavity 36, and in the lower end of the cavity 36, there is passageway 38 forming valve seat 40.

Positioned within the upper end of valve body 34 is an insert 42 which is pressed in permanent position in the valve body. The insert 42 has a threaded axial opening 44 which receives a valve needle 46. The upper portion of needle 46 is threaded to engage the threaded opening 44 in insert 42. The lower end 42B of insert 42 is contoured so as to complete the general elliptical configuration of cavity 36. Needle 44 has an enlarged integral flange 48 so as to prevent the needle from being fully backed out after insert 42 is installed. Externally of the valve a knurled member 50 is fixed to the needle so that it is manually adjustable. The needle 46, insert 42, and knurl member 50 are assembled in this manner: The needle is first threaded into insert 42 and then it is pressed fitted into valve body 34, after which the knurl member 50 is attached. By adjusting the needle 46 by knurled member 50 the opening between the tapered lower end 46A and valve seat 40 is adjusted to control the amount of air passing through the valve.

The valve body 34 has a threaded lower end 34A which receives a flange 52. The lower end 52A of flange 50 is of reduced diameter and the lower end thereof is threaded (not illustrated) to receive a coupling 54 by which tube 28 is connected to the lower end of the valve. The reduced diameter portion 52A of the flange is received in an opening 56 in a vessel cap 58 to provide an easy means for supporting the valve 30 and tube 28 to the vessel. The upper end 28B of the vessel is of reduced diameter and externally threaded to receive cap 58. By unthreading cap 58, not only is the valve 30 and tube 28 removed, but the interior of the vessel is exposed for addition of liquid for purposes which will be described subsequently.

In order to prevent dust or other contaminant from entering into the engine by air drawn through the container, the valve 30 includes a filter 60 held in place by a flange 62. The filter 60 may be a small piece of porous material such as sponge rubber or the like which passes air therethrough but which intercepts dust or other particles.

Positioned within vessel 20 is a water emissible solution 64. As air is drawn through valve 30 and tube 28 it bubbles upwardly within the liquid 64 to form a vapor, the vapor may also include mist or portions of the liquid not completely dissolved in the air by which it is carried. This vapor is thus pulled into the engine through the conduit 26 and co-mingles with the air-fuel mixture from carburetor 14. The function of the vapor is to improve the combustion characteristics of the fuel-air mixture and thereby improve performance of engine 10.

A specific formulation of liquid 64 is not a part of this invention. The invention will function to improve combustion wherein the liquid 64 is only water since it has been established that the introduction of water vapor improves the performance of internal combustion engines.

Vessel 20 may be any type of container; however, the preferred arrangement is that it be made of clear material such as plastic or glass so that the level of liquid 64 may be readily ascertained and additional liquid added as needed. Heavy polyethylene is an ideal material for vessel 20.

OPERATION

With the vessel 20 partially filled with liquid so that the top level thereof is below the air outlet 24, and with engine 10 operating, vacuum is applied by way of conduit 24, to the interior of the vessel. This causes air to flow into the vessel through valve 30. The quantity of air is carefully adjustable by adjusting needle 46 utilizing the knurled member 50. The quantity of air is carefully adjusted so that the proper bubbling effect is achieved to secure optimum creation of vapor for mixing with the fuel-air mixture passing out of the engine carburetor 14. The construction of the valve is particularly illustrated employing the elliptical configured cavity 36 has been found to be ideal in practice of the invention and harmonic conditions may be established predicated upon the rate of air flow to take advance of the cavity configuration to thereby increase the amount of vapor imparted to the air flowing into the engine from the interior of the container 20.

The liquid 64 may include other ingredients both liquids and solids which are water soluble and which may be carried as vapors or mists to the engine intake manifold 12, to increase and support combustion and effectively improve the performance of the gasoline fuel by providing a higher octane reaction. This is achieved by reducing the flash point of the vaporized gasoline fuel so that the overall engine performance is improved, and when the engine is in a vehicle such as a truck or car, mileage performance is enhanced.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

I claim:

1. A performance improving means for an internal combustion engine having an intake manifold, a carburetor and a vacuum intake between the manifold and carburetor, comprising:

an upright vessel having an inlet of size large enough to readily receive liquid poured into the vessel, and an outlet opening in the upper portion of the vessel;

a cap removably closing said inlet in said vessel, the cap having a central opening therethrough, means connecting said vessel outlet to the engine vacuum intake;

an upright valve having the lower portion received in said opening in said cap, the valve being secured to said cap, the valve having a longitudinal body with an axial opening therethrough, the upper portion of the axial opening being threaded and the lower portion of the axial opening communicating with the valve lower end, the axial opening being configured by generation of an ellipse rotated around the axis of the yoke, the valve having an air inlet side opening intersecting said axial opening, and having a valve seat separating the axial opening upper and lower portions, and the valve having a needle member having a threaded upper portion threadably received in the axial opening upper threaded portion, the lower end of the needle member being tapered to confirm with the valve seat, the upper end of the needle member extending exteriorly of the valve body and having means whereby the needle member may be threadably adjusted to regulate the flow of air through the valve seat;

a tube within said vessel communicating at its upper end with said valve axial opening lower end, the lower end of the tube terminating adjacent the vessel bottom;

a water emissible liquid within said vessel, the level thereof being below said vessel outlet opening, air being drawn into said vessel through said valve and tube and out through said connecting means to the engine intake manifold, the air bubbling upwardly through said liquid and carrying vapor therefrom into the engine intake manifold.

2. A performance improving means for an internal combustion engine having an intake manifold, a carburetor and a vacuum intake between the manifold and carburetor, comprising:

an upright vessel having an inlet of size large enough to readily receive liquid poured into the vessel, and an outlet opening in the upper portion of the vessel;

a cap removably closing said inlet in said vessel, the cap having a central opening therethrough, means connecting said vessel outlet to the engine vacuum intake;

an upright valve having the lower portion received in said opening in said cap, the valve being secured to said cap, the valve having a longitudinal body with an axial opening therethrough, the upper portion of the axial opening being threaded and the lower portion of the axial opening communicating with the valve lower end, the valve having an air inlet side opening intersecting said axial opening, and having a valve seat separating the axial opening upper and lower portions, and the valve having a needle member having a threaded upper portion threadably received in the axial opening upper threaded portion, the lower end of the needle member being tapered to conform with the valve seat, the upper end of the needle member extending exteriorly of the valve body and having means whereby the needle member may be threadably adjusted to regulate the flow of air through the valve seat;

a tube within said vessel communicating at its upper end with said valve axial opening lower end, the lower end of the tube terminating adjacent the vessel bottom;

a water emissible liquid within said vessel, the level thereof being below said vessel outlet opening, air being drawn into said vessel through said valve and tube and out through said connecting means to the engine intake manifold, the air bubbling upwardly through said liquid and carrying vapor therefrom into the engine intake manifold;

a flange member affixed to the exterior of said valve, the flange member having a vertical portion extending parallel to and spaced from the valve body exterior, the paralleled flange portion having a large diameter opening therein coaxial with aid valve air inlet; and a pad of filter material positioned in said opening in said flange parallel portion and in engagement with said valve inlet opening whereby air drawn in through the valve inlet is filtered as it passes through the filter pad.

* * * * *